Oct. 15, 1935.　　　　K. A. BRAINARD　　　　2,017,749
VEHICLE BLOCKING DEVICE
Filed Feb. 23, 1932　　　　2 Sheets-Sheet 1
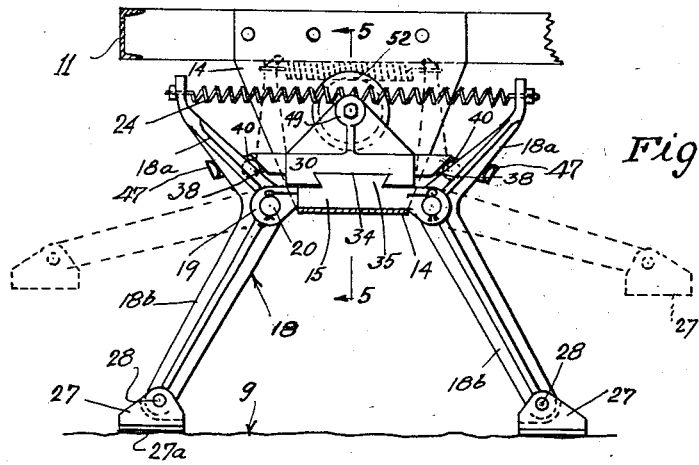
Fig. 2.
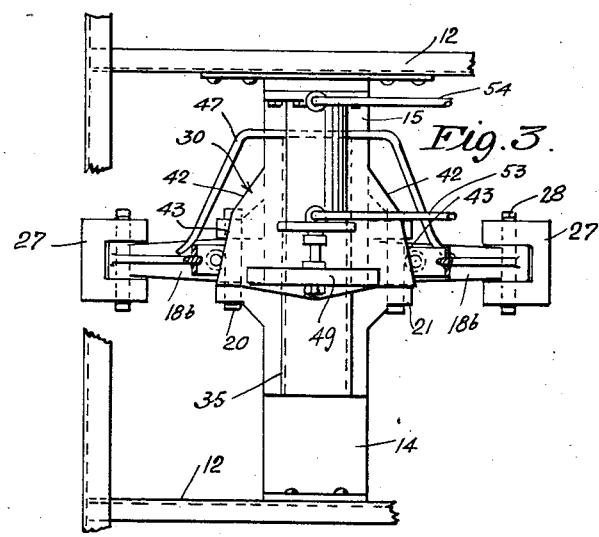
Fig. 3.
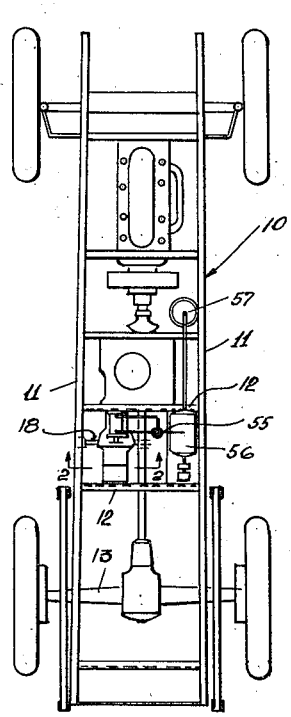
Fig. 1.
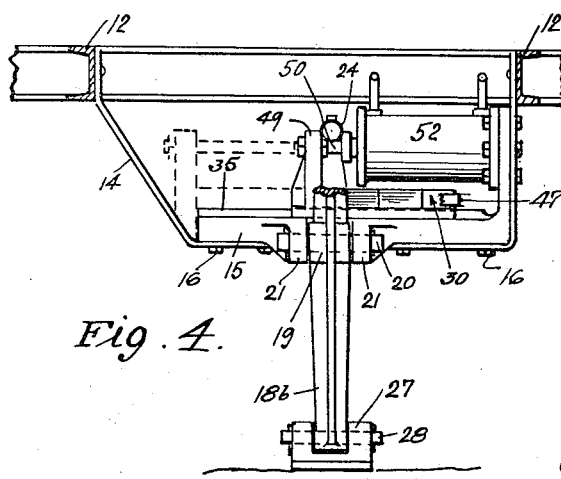
Fig. 4.
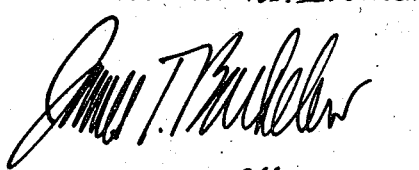
Inventor
Kenneth A. Brainard.
Attorney.

Oct. 15, 1935.   K. A. BRAINARD   2,017,749
VEHICLE BLOCKING DEVICE
Filed Feb. 23, 1932   2 Sheets-Sheet 2
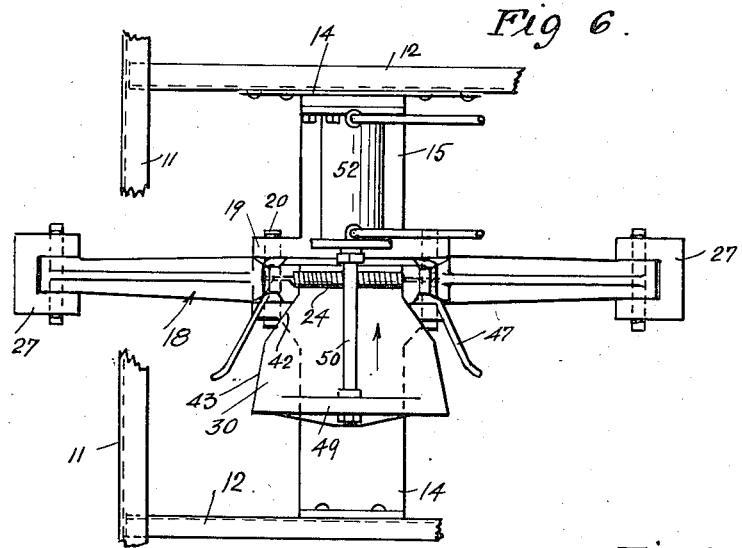
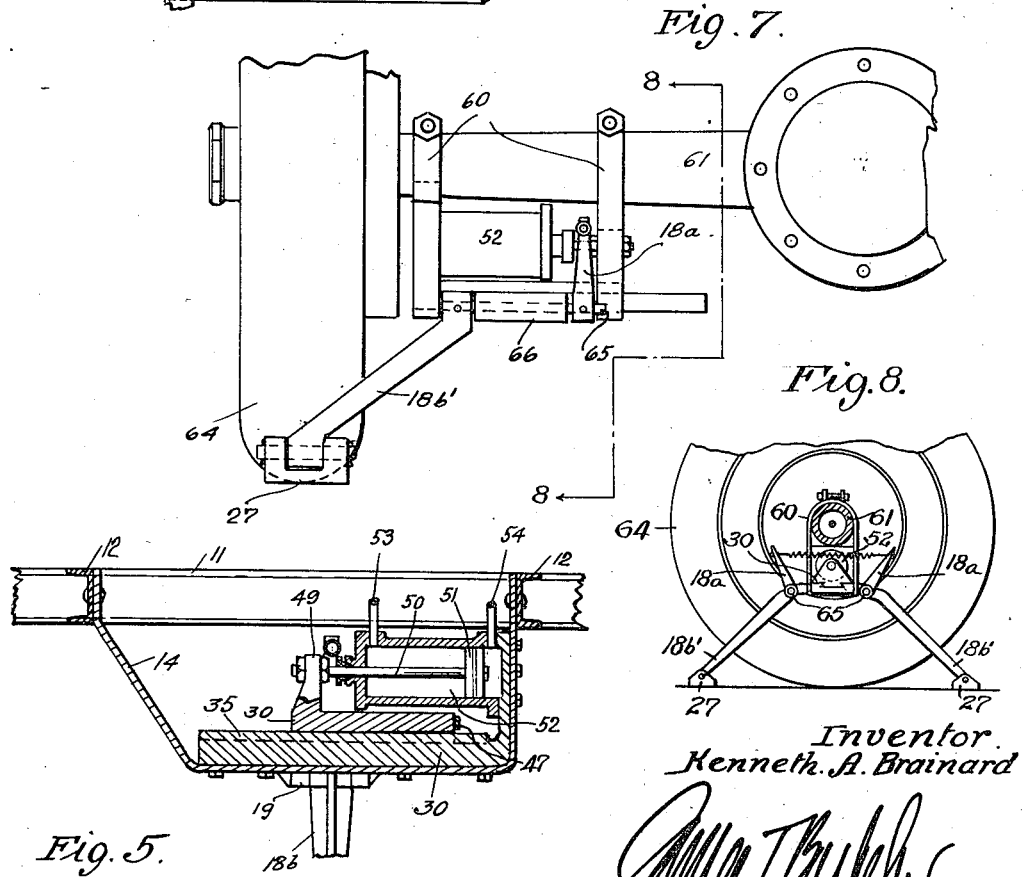
Inventor.
Kenneth A. Brainard
Attorney.

Patented Oct. 15, 1935

2,017,749

UNITED STATES PATENT OFFICE 2,017,749

VEHICLE BLOCKING DEVICE

Kenneth A. Brainard, Beverly Hills, Calif.

Application February 23, 1932, Serial No. 594,501

16 Claims. (Cl. 188—5)

This invention relates generally to vehicle blocking devices, it being the general object of the invention to provide a device adapted to be mounted on a vehicle, and equipped with shoes adapted to be forced downwardly into engagement with the ground surface to block the vehicle against rolling.

There are many occasions in the operation of all classes of vehicles which call for the blocking of the vehicle against rolling. For example, such occasions arise when it is desired to park an automobile on sloping ground, in holding back an airplane while the motor is being run, etc. It has been the common expedient in the past to block vehicles on such occasions by placing blocks under the wheels. This procedure, however, entails considerable inconvenience to the operator, suitable blocks often are not at hand, and at best much time and bother are involved.

In accordance with the present invention, there is provided on the vehicle a device adapted to be operated under convenient manual control to firmly engage the ground surface and so block the vehicle. In its preferred form, the device takes the form of a pair of lever arms pivoted on the vehicle so as to be capable of swinging down into ground engagement, a wedge member being mounted to move between and engage the lever arms to accomplish such operation, and manually controllable power means being provided for the operation of the wedge member.

The invention will now best be understood from the following detailed description of a present preferred embodiment thereof, reference for this purpose being had to the accompanying drawings, in which:

Fig. 1 is a plan view of an automobile chassis equipped with my vehicle blocking device;

Fig. 2 is an elevation showing the device in ground engaging position, being a view as taken by line 2—2 of Fig. 1;

Fig. 3 is a plan view, partly in section, showing the device in lowered or operative position;

Fig. 4 is an elevation looking from the right in Fig. 2;

Fig. 5 is a vertical longitudinal section taken on line 5—5 of Fig. 2;

Fig. 6 is a view similar to Fig. 3 but showing the device in raised or inoperative position;

Fig. 7 is a view showing a variational arrangement of the device; and

Fig. 8 is a reduced side elevation of Fig. 7, being a section taken on line 8—8 of Fig. 7.

In Fig. 1 of the drawings, the numeral 10 designates generally the chassis of an automobile, the longitudinal side channels of which being designated at 11. My device is adapted to be mounted at any convenient place on the chassis, although I have typically illustrated it as mounted between a pair of spaced cross channels 12 connecting members 11 somewhat forwardly of rear axle 13. It will be understood, however, that my device may be located at any convenient place on the chassis; and also that the device is not limited to automobiles, but is applicable to other vehicles, as well.

Suspended from cross member 12 is a hanger 14 on which the vehicle blocking device proper is mounted. As shown in Fig. 4, a mounting plate 15 for the device is fastened down on hanger 14 as by screws 16. Pivoted at opposite edges of mounting plate 15 so as to swing in a vertical plane, which in the illustrative case is transverse of the vehicle length, is a pair of levers 18. These levers each consist of an upper arm 18a and a lower arm 18b, which levers extend preferably at about, or slightly greater than, right angles to each other from a hub 19, which hub pivots on a horizontal pin 20 carried by lugs 21 formed on opposite side edges of mounting plate 15. The upper ends of upper lever arms 18a are connected by a tension spring 24, which tends at all times yieldingly to hold the levers in their upper inoperative position, indicated in dotted lines in Fig. 2. The limit of upward swing of the levers may be fixed by the provision of any suitable stop, although in the present instance that limit is set by the coils of spring 24 coming against one another.

The outer ends of lower lever arms 18b have ground engaging shoes 27 pivotally mounted on them, as indicated. The pivot pins 28 on which the shoes are hung on the levers are horizontal and parallel to the pins 20 on which the levers are mounted, and the shoes are weighted such as to hang normally with their flat under surfaces 27a disposed parallel to the ground surface, indicated at 9. By this provision, when the levers are lowered from the dotted line to the full line position of Fig. 1, the shoes are enabled to swing to bring the ground engaging surfaces of the shoes into good engagement with the ground surface.

The preferred means for lowering the levers is embodied as follows: Mounted to slide on the upper surface of plate 15 between upper lever arms 18a is a wedge plate 30, which is designed to act on the levers to spread their upper arms apart to bring their lower arms into ground engagement. Provisions are made for constraining this wedge plate to slide in a horizontal plane on plate 15 at right angles to the vertical swinging plane of the levers. For this purpose one of the plates, here the wedge plate, is cut with a longitudinally extending way 34, preferably dove-tailed in cross section, and the other plate, here mounting plate 15, is formed with a corresponding longitudinal projection 35, the projection being provided with a freely sliding fit in the way. It will be seen that the dove-tailed cross section affords undercut groove portions in the one plate into which the projections 35 of the other plate fit with a side tongue effect, the wedge plate thereby being confined against vertical separation from the mounting plate. Of course, any guide means for constraining the wedge plate to the longitudinal sliding movement described may be substituted if desired, although the one illustrated is preferred.

The two side edges 38 of the wedge plate are formed with beveled cam surfaces adapted to engage anti-friction balls 40 carried in suitable sockets provided in upper lever arms 18a (see Fig. 2). The balls 40 of course simply afford anti-friction bearings between the cam surfaces of the wedge plate and the arms broadly, the cam surfaces may be considered as engaging the arms. The bevel of the cam surfaces of the wedge member as seen in vertical transverse section, or as seen for instance in the end elevation aspect of Fig. 2 varies in such a manner as to correspond to the slopes of the upper lever arms 18a in their various positions as they are moved by the wedge, the bevel therefore increasing rearwardly from a vertical at the nose of the wedge to the extreme bevel at the rear, as seen in Fig. 2. In the normal inoperative position of the device, the levers are of course up, and the wedge member 30 is in its rearmost position (see Fig. 6). To operate the device, the wedge member is moved forwardly, or in the direction of the arrow in Fig. 6, to bring the rearwardly diverging wedge surfaces against lever arms 18a to spread them against spring 24 until the lower arms of the lever have brought their shoes 27 into firm engagement with the ground surface. The wedge surfaces are preferably formed in two cam sections 42 and 43, respectively, the first being of comparatively large slope so as initially to move the levers quickly down, and the second being of small slope to give slower action and greater force in accomplishing the final engagement of the shoes with the ground surface.

To return the device to the raised inoperative position, the wedge member is simply slid back to the position of Fig. 6, spring 24 thereupon acting to raise the levers. Means are shown for holding the levers in upper inoperative position in case of breakage of spring 24, this means comprising a gathering bar 47 secured to the nose of the wedge member and extending rearwardly along each side of the wedge at a spacing proper to take the lever arms. It will be evident that should spring 24 break, this bar will gather lever arms 18a as the wedge member is moved rearwardly and will raise the levers to the proper inoperative position.

Any suitable power means may be provided for the operation of the wedge member, that shown involving a piston connected to the wedge and working under controlled air pressure in a cylinder. For this purpose, the wedge member is provided at its rearward end with a standard 49, which is connected by a rod 50 with a piston 51 working in a cylinder 52. Connected into the opposite ends of cylinder 52 are fluid lines 53 and 54 which lead from a three-way valve 55 (see Fig. 1) that controls admission of fluid under pressure from a pressure tank 56. This tank 56 may be supplied with air under pressure from a suitable air compressor, designated at 57. The three-way valve 55 is of course under the control of the operator of the vehicle, and when in position to admit air through fluid line 53 to the rearward end of cylinder 52, the fluid pressure on piston 51 moves it forwardly and thereby carries the wedge member forwardly into engagement with the lever arms, swinging them down to block the vehicle. To subsequently raise the levers, the control valve is operated to close off line 53 and open line 54, thereby causing air to be admitted to the forward end of the cylinder to force the piston and wedge member rearwardly, whereupon spring 24 acts as previously described to lift the levers to unblock the vehicle.

In Fig. 7 is shown a variational arrangement in which the levers are mounted to swing in a plane extending in the direction of the vehicle length, the device here being mounted in a suitable hanger 60 suspended from the rear axle 61 of the vehicle. Thus the lower lever arms 18b' will engage the ground surface at points in front of and behind the point of engagement of the rear vehicle tire 64 with the ground. In the structure illustrated, the lower lever arms 18b' are each rigidly mounted on one end of a pin 65 journaled in mounting plate lug 66, the other end of said pin having rigidly mounted thereon the upper lever arm 18a'. And in this arrangement I prefer to dispose the lower lever arms outwardly so as to engage the ground in the plane of the rear wheels, all as will be clearly apparent from Fig. 7.

Another variational arrangement involves the simple omission of one of the levers. And in such a case, if the lever is arranged to swing in a plane parallel with the vehicle length, as in Fig. 7, the device may be operated to actually lift the vehicle until the near wheel clears the ground surface.

It will now be understood that I have provided a simple, rugged and easily operable device for positively engaging the ground surface to block a vehicle equipped therewith against rolling forwardly or rearwardly. The device is so constructed that when once set in ground engaging position, it can not become accidentally loosened and so permit the vehicle to roll. The use of this device thus permits the vehicle to be effectively and safely blocked by a simple and easily accomplished operation, entirely doing away with such undesirable prior expedients as the manual placing of blocks under the wheels as has heretofore been common. It is also to be mentioned that my device may be used as a drag brake in an emergency case of failure of the usual service brakes of the vehicle.

It will be understood the drawings and description are to be considered as illustrative of and not restrictive on the broader claims appended hereto, for various changes of design, structure and arrangement may be made without departing from the spirit and scope of said claims.

I claim:

1. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended, and means for moving the upper arms of the levers apart to lower the lower arms and force them into ground engagement.

2. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended and their upper arms upwardly extended, spring means yieldingly resisting displacement of said levers from said last mentioned position, and means for moving the upper arms of the levers apart against said spring means to lower the lower arms and force them into ground engagement.

3. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended and their upper arms upwardly extended, a tension spring connected between said upper lever arms to yieldingly resist displacement of said levers from said last mentioned position, and lever operating means for moving the levers against said spring to bring the lower lever arms into engagement with the ground surface.

4. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended and their upper arms upwardly extended, and a wedge member mounted on said mounting member and adapted to be moved to wedge said upper lever arms apart, whereby said lower lever arms are moved downwardly into ground engagement.

5. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended and their upper arms upwardly extended, spring means yieldingly resisting displacement of said levers from said last mentioned position, and a wedge member mounted on said mounting member and adapted to be moved to wedge said upper lever arms apart, whereby said lower lever arms are moved downwardly into ground engagement.

6. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended and their upper arms upwardly extended, a wedge member slidably mounted on said mounting member to be moved between said upper lever arms to spread said arms apart, whereby said lower lever arms are moved downwardly into ground engagement, and means to slide said wedge member.

7. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended and their upper arms upwardly extended, spring means yieldingly resisting displacement of said levers from said last mentioned position, a wedge member slidably mounted on said mounting member to be moved between said upper lever arms to spread said arms apart, whereby said lower lever arms are moved downwardly into ground engagement, and means to slide said wedge member.

8. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended and their upper arms upwardly extended, a wedge plate mounted on said mounting plate to slide between said upper lever arms to spread said arms apart, said mounting and wedge plates being provided one with a longitudinal projection and the other with a complemental groove taking said projection whereby said wedge plate is constrained to movement at right angles to the swinging plane of said levers, and means to slide said wedge member.

9. A vehicle blocking device embodying a mounting member adapted to be mounted on a vehicle, a pair of levers having intermediate pivotal mountings on said mounting member so as to swing in a vertical plane, each of said levers comprising a lower arm adapted at its free end for ground engagement and an upper arm, said levers normally occupying a position with their lower arms elevated and oppositely extended and their upper arms upwardly extended, a wedge plate mounted on said mounting plate to slide between said upper lever arms to spread said arms apart, said mounting and wedge plates being provided one with a longitudinal projection of dove-tail cross section and the other with a complemental groove taking said projection whereby said wedge plate is constrained to movement at right angles to the swinging plane of said levers, and means to slide said wedge member.

10. A vehicle blocking device embodying a mounting member adapted to be mounted on a vehicle, a lever pivoted on said mounting member to swing between an upper inoperative position and a lower ground engaging position, a spring constantly urging said lever towards said inoperative position, and a cam member operably mounted on said mounting member and operable on said lever to move it into ground engagement.

11. A vehicle blocking device embodying a mounting member adapted to be mounted on a vehicle, a lever pivoted on said mounting member to swing between an upper inoperative position and a lower ground engaging position, and a cam member operably mounted on said mounting member and operable on said lever to move it into ground engagement.

12. A vehicle blocking device embodying a mounting member adapted to be mounted on a vehicle, a pair of levers pivoted on said mounting member to swing between upper inoperative positions and lower ground engaging positions, shoes on the lower ends of said levers adapted for frictional, non-movable engagement with the ground surface, means for normally retaining said levers in inoperative position, and a single lever operating means for forcing said levers in unison into ground engaging position, whereby the vehicle is blocked against forward and rearward movement.

13. A vehicle blocking device embodying a mounting member adapted to be mounted on a vehicle, a pair of levers pivoted on said mounting member to swing between upper inoperative positions and lower ground engaging positions, shoes on the lower ends of said levers adapted for frictional, non-movable engagement with the ground surface, spring means for normally retaining said levers in inoperative position, and lever operating means for forcing said levers in unison into ground engaging position, whereby the vehicle is blocked against forward and rearward movement.

14. A vehicle blocking device embodying a mounting member adapted to be mounted on a vehicle, a pair of levers having pivotal mountings on said mounting member so as to swing in a vertical plane transversely of the vehicle length, shoes on the lower ends of said levers adapted for frictional, non-movable engagement with the ground surface, and means acting on said levers to force the free lever ends into ground engagement, whereby the vehicle is blocked against forward and rearward movement.

15. A vehicle blocking device embodying a mounting member adapted to be mounted on a vehicle, a pair of levers having pivotal mountings on said mounting member so as to swing in a vertical plane, said levers normally occupying elevated oppositely extending positions, and wedge means mounted on said mounting member adapted to be moved to cause said lever arms to move downwardly into ground engagement.

16. In combination, a lever arm having a pivotal mounting, a slide member mounted to slide on a line parallel to the pivot axis of said lever mounting, and a cam surface on said slide member having operative engagement with said lever arm, whereby motion may be transmitted between the slide member and the lever arm.

KENNETH A. BRAINARD.